(No Model.)
H. C. RICE.
Filter for Vessels.
No. 236,628. Patented Jan. 11, 1881.
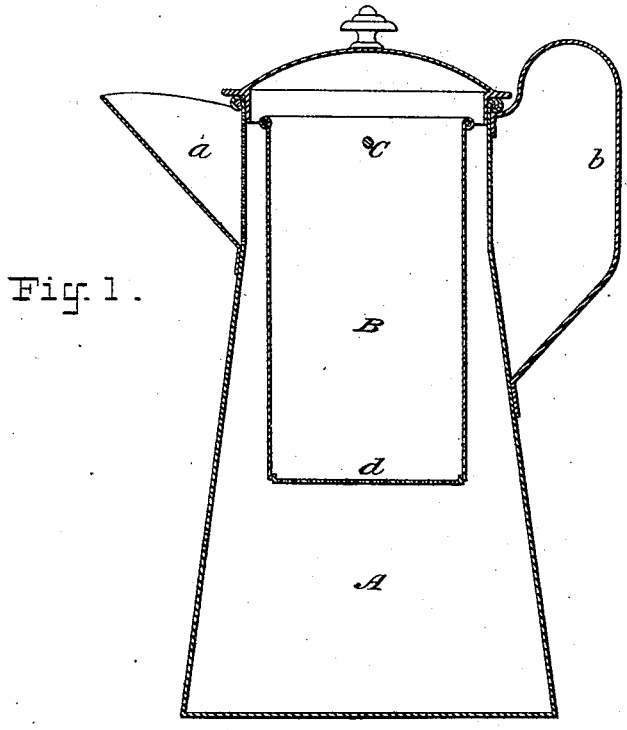
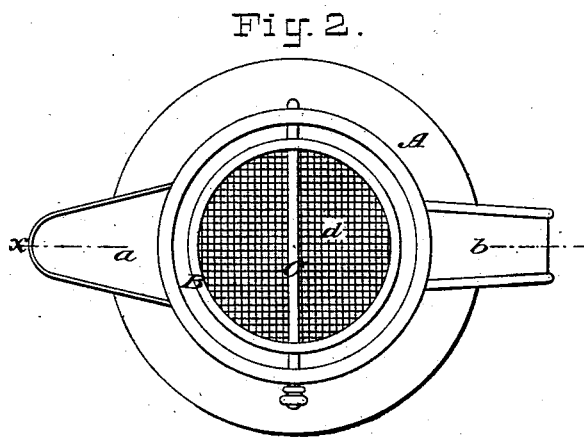
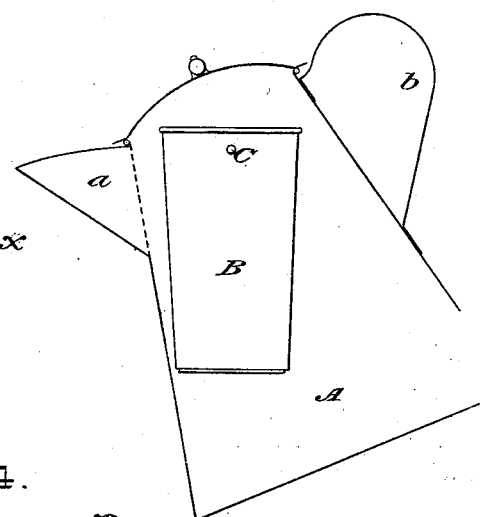
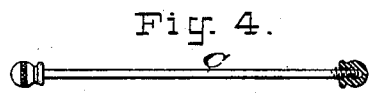
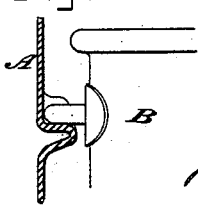
ATTEST:
E. B. Bolton
Julian A. Hurdle
INVENTOR:
Henry C. Rice,
By his Attorneys:
Burke, Fraser & Bounett
N. PETERS, PHOTO-LITHOGRAPHER, WASHINGTON, D. C.

UNITED STATES PATENT OFFICE.

HENRY C. RICE, OF LOUISIANA, MISSOURI.

FILTER FOR VESSELS.

SPECIFICATION forming part of Letters Patent No. 236,628, dated January 11, 1881.

Application filed July 1, 1880. (No model.)

*To all whom it may concern:*

Be it known that I, HENRY C. RICE, a citizen of the United States, residing at Louisiana, in the county of Pike and State of Missouri, have invented certain new and useful Improvements in Mounting Filters in Coffee-Pots and other Vessels, of which the following is a specification.

My invention, as the title indicates, relates to a mode of mounting strainers or filters in coffee-pots and other vessels, the object sought beir, partly convenience and simplicity of mounting and partly a suspended gravity mounting which will cause the filter to retain its normal vertical position, or nearly so, when ''.e pot or vessel is tilted.

In the drawings, which serve to illustrate my invention, Figure 1 is a vertical mid-section through a coffee-pot provided with my improvements, the section being taken on the line $x\ x$ in Fig. 2, which latter is a plan of the pot with the cover removed. Fig. 3 is a sectional view arranged to illustrate the position of the filter with reference to the inclosing-vessel when the latter is tilted. Fig. 4 is a view of one form of rod on which the filter is hung; and Fig. 5 is a detail of a modification, which will be referred to more particularly hereinafter.

Let A represent a coffee-pot or other similar inclosing-vessel, and B a filter or strainer hung or suspended therein. In the present instance the filter is hung on a wire or rod, C, which passes through the walls of the vessel and the filter, as shown in Fig. 2, its axis being at right angles (or sufficiently near it) to the line $x\ x$, which bisects the spout $a$ and handle $b$. I may, however, in lieu of the rod C, provide the filter with short lugs on each side, and form suitable bearings in or on the inner wall of the vessel to receive them when the filter is inserted. Such a construction is indicated in Fig. 5. I prefer, however, to employ the pin C, either with a nut, $c$, as shown in Fig. 4, or without, as in Fig. 2, as this mounting is simpler and more cheaply constructed.

The filter is provided with a foraminous bottom, $d$, in the usual way, and when the pot is tilted in pouring the filter retains its vertical position, and its contents are thus prevented from escaping over its top, either into the inclosing-vessel or out at the spout.

I contemplate applying my method of suspending filters to coffee-pots and other vessels already in use, supplying the filters, and suspending them when necessary; but the application of the invention will also be extended, and perhaps, in the main, to new pots or vessels.

My invention may be applied to ice-pitchers, a cage for ice being substituted for the filter B; and the filter may be cylindrical, as in Fig. 1, tapered, as in Fig. 3, or made in any suitable or convenient manner.

I am fully aware that filters of various kinds have been suspended from beads or ledges in coffee-pots or vessels; but I am not aware of any hung so as to swing in this manner.

I am also aware that it is not new to suspend objects or vessels on pivots so that they will maintain their normal upright positions by force of gravity, and I make no claim to this; but What I do claim is—

1. The combination, with the inclosing pot or vessel, of the filter or holder hung or suspended on pivots within the inclosing-vessel, the axis of the said pivots being arranged substantially at right angles to the axis of the spout of the inclosing-vessel, as set forth.

2. The combination of the inclosing-vessel A, the filter B, and the pin C, the said pin being passed through both the filter and inclosing-vessel substantially at right angles to the spout $a$, so as to pivot the filter, substantially as and for the purposes set forth.

In witness whereof I have hereunto signed my name in the presence of two subscribing witnesses.

HENRY C. RICE.

Witnesses:
 F. P. SNYDER,
 J. R. MCGREGOR.